Patented Jan. 30, 1951

2,540,054

UNITED STATES PATENT OFFICE 2,540,054

4,4-DICARBALKOXYBUTENALS AND PROCESS

Owen A. Moe and Donald T. Warner, Minneapolis, Minn., assignors to General Mills, Inc., a corporation of Delaware No Drawing. Application October 28, 1948, Serial No. 57,125

6 Claims. (Cl. 260—483)

The present invention relates to the synthesis of butenals and to the resultant products. The products obtained are highly functional and are capable of use in a wide variety of ways in organic syntheses.

The products of the present invention have the following formula:

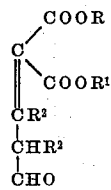

in which R and $R^1$ are alkyl groups containing from one to four carbon atoms, and $R^2$ and $R^3$ may be hydrogen or methyl. These compounds are of great value in view of the high functionality of the compounds and the fact that various groups may be employed to enter into typical organic reactions. Typical of the reactions of which these compounds are capable is the formation of the phenylhydrazone and the cyclization of the phenylhydrazone to the corresponding indole compound. The compounds of the present invention, therefore, provide a means of preparing indole compounds having an unsaturated side chain.

The products of the present invention may be made by the dehydrohalogenation of the corresponding aldehydes, which aldehydes are disclosed and claimed in our copending application, Serial No. 57,124, entitled Halogen Substituted Gamma, Gamma - Dicarbalkoxybutyraldehydes and Process, filed of even date herewith. These aldehydes have the following formula:

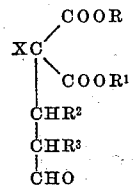

in which R, $R^1$, $R^2$ and $R^3$ are as above defined, and in which X is either chlorine or bromine. The compounds of the present invention may be made from these haloaldehydes by first preparing the haloaldehydes, isolating them, and then dehydrohalogenating them. As an alternative and preferred procedure, the compounds of the present invention may be made by reacting halogen substituted malonic esters with unsaturated aldehydes such as acrolein, methacrolein, and crotonaldehyde, in the presence of a strong alkaline catalyst such as sodium ethoxide which appears to effect dehydrohalogenation in situ.

When preparing the aldehydes of the present invention according to the latter method, the halo-substituted malonic ester is dissolved in a suitable solvent such as absolute ethanol, and the sodium ethoxide catalyst added as a solution in absolute ethanol. The alpha, beta-unsaturated aldehyde is then added slowly with agitation and the temperature is maintained below about 20° C. The reaction mixture is agitated at room temperature for an extended period of time to allow the reaction to go to completion. Thereafter a further quantity of sodium ethoxide is added to effect dehydrohalogenation. The addition of the sodium ethoxide results in a marked increase in reaction temperature and as the base is added the precipitation of sodium halide is noted. After the base has been added the reaction mixture is agitated for an additional period of time to permit the reaction to be completed, after which the reaction mixture is neutralized with a suitable acid such as glacial acetic acid. The reaction mixture is then filtered for the removal of the inorganic precipitate and the filtrate is subjected to vacuum distillation for the purpose of removing the solvent. The residual oil contains the desired aldehyde and can be worked up in the usual manner for recovery of the pure product.

When the haloaldehyde is first isolated for preparation of the butenal, it may be made by approximately the same manner as above described, with the exception that a milder alkaline catalyst such as a tertiary butyl amine, for example tributylamine, is used. The haloaldehyde may then be isolated from the reaction mixture and subjected to the action of sodium ethoxide in ethanol for the purpose of effecting dehydrohalogenation. The following examples will serve to illustrate the invention.

Example 1

Ethyl bromomalonate (24 g.) was dissolved in 100 cc. of absolute ethanol. A solution of sodium ethoxide (0.1 g. of sodium and 10 cc. of absolute ethanol) was added. Redistilled methacrolein (7.4 g.) was added dropwise with stirring. The reaction mixture was acidic to litmus and no apparent rise in the reaction temperature was noted. After stirring at room temperature for a period of three hours, a solution of sodium ethoxide (2.2 g. of sodium and 50 cc. of absolute ethanol) was added slowly in portions. A marked increase in the reaction temperature was observed and as the addition of the base continued, sodium bromide precipitated from the reaction mixture. After the addition of the base was completed, the reaction mixture was stirred for an additional hour at room temperature and then neutralized with glacial acetic acid. The inorganic precipitate was removed by filtration and the solvent was removed by concentration in vacuo. The residual oil thus obtained was dissolved in 125 cc. of benzene. The benzene solution was washed with three 100 cc. portions of water and then dried over anhydrous sodium sulfate. After the removal of the benzene, the residual oil was distilled under diminished pressure. The desired fraction was collected at 88–95° C. at 0.15–0.18 mm. $n_D^{30}$ 1.4523.

When a portion of the above aldehyde compound was mixed with 2,4-dinitrophenylhydrazine in a conventional manner, a copious quantity of the 2,4-dinitrophenylhydrazone was obtained. The crude product melted at 122–126° C. After two crystallizations from ethanol, it melted at 131–133° C. and was submitted for analysis. Anal.—Calcd. for $C_{17}H_{20}O_8N_4$: C, 50.10; H, 4.9; N, 13.72. Found: C, 49.97; H, 4.95; N, 13.73

*Example 2*

47.6 g. of ethyl bromomalonate were added to an alcoholic solution containing 200 cc. of absolute ethanol and 80 mg. of sodium. The resulting alcoholic solution was cooled to 0° C. and 11.5 g. of acrolein were added dropwise. Difficulty was encountered in maintaining the alkalinity of the reaction mixture. An additional 0.5 g. of metallic sodium was added. However, the reaction mixture was still acidic. Therefore, an additional 4 g. of metallic sodium were dissolved in approximately 100 cc. of absolute ethanol. Nearly all of this sodium ethoxide solution was required in order to maintain alkalinity. The reaction mixture was cooled to 3° C. and allowed to stand in the refrigerator overnight. After standing, a considerable quantity of precipitate (sodium bromide) was noted and it was removed by filtration and the clear light brown filtrate was evaporated in vacuo. The residual material was diluted with benzene and an additional quantity of inorganic precipitate was removed by filtration. The benzene filtrate was concentrated in vacuo yielding an additional quantity of inorganic precipitate. An additional quantity of benzene was added and after filtration the benzene solution was extracted three times with 70 cc. portions of water. The benzene solution was dried over anhydrous sodium sulfate and after filtration the filtrate was evaporated in vacuo yielding 34.7 g. of a light yellow oil. A portion of this residual oil was treated with 2,4-dinitrophenylhydrazine in the usual manner and the resulting 2,4-dinitrophenylhydrazone was obtained as yellow needles melting at 137.5–139° C. The crude product was purified by recrystallization from absolute ethanol yielding orange-yellow needles melting at 141.5–142.5° C. Analysis.—Calcd. for $C_{16}H_{18}O_8N_4$: C, 48.75; H, 4.61; N, 14.21. Found: C, 48.61; H, 4.60; N, 13.81.

*Example 3*

Ethyl chloromalonate (19.5 g.) was dissolved in 100 cc. of absolute ethanol and 0.5 cc. of tributylamine was added. Re-distilled crotonaldehyde (7.4 g.) was added dropwise. No increase in the reaction temperature was noted and the reaction mixture was acidic to litmus. After the addition of the aldehyde was complete, the reaction mixture was stirred at room temperature for a two hour period and then heated to 45–50° C. for a ten minute period. After standing at room temperature overnight, the catalyst was neutralized with glacial acetic acid. The solvent was removed by distillation in vacuo and the residual oil was dissolved in 125 cc. benzene. After washing with three 100 cc. portions of water, the benzene solution was dried over anhydrous sodium sulfate. The benzene was removed by distillation and the residual oil was distilled under diminished pressure. The desired fraction was collected at 90–93° C. at 0.17 mm. $n_D^{25}$ 1.4452. When a portion of this product was mixed with 2,4-dinitrophenylhydrazine in the conventional manner, a copious quantity of a crystalline 2,4-dinitrophenylhydrazone was obtained. The crude product melted at 117–127° C. and after two crystallizations from ethanol it melted at 138–139° C. Anal.—Calcd. for $C_{17}H_{21}O_8N_4Cl$: C, 45.89; H, 4.72; N, 12.59. Found: C, 45.82; H, 4.94; N, 12.85. This chloroaldehyde may be converted to the corresponding butenal by subjecting it to the action of the requisite quantity of sodium ethoxide in ethanol and recovering the butenal in the manner described in the previous examples.

While various modifications of the invention have been described, it is to be understood that the invention is not limited thereto, but that other modifications may be made without departing from the spirit thereof.

We claim as our invention:

1. Aldehydes having the following formula:

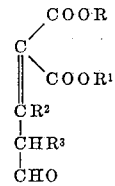

in which R and $R^1$ are lower alkyl groups containing from one to four carbon atoms, $R^2$ and $R^3$ are selected from the group consisting of hydrogen and methyl and $R^2$ and $R^3$ are not both methyl.

2. 4,4-dicarbethoxy-2-methyl-3-butenal.
3. 4,4-dicarbethoxy-3-butenal.
4. 4,4-dicarbethoxy-3-methyl-3-butenal.
5. Process of making unsaturated aldehydes having the following formula:

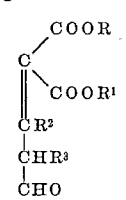

in which R and $R^1$ are lower alkyl groups containing from one to four carbon atoms, $R^2$ and $R^3$ are selected from the group consisting of hydrogen and methyl and $R^2$ and $R^3$ are not both methyl, which comprises reacting an unsaturated aldehyde having the following formula

with a halogen substituted malonic ester in the presence of a strongly alkaline condensation catalyst.

6. Process of making aldehydes having the formula

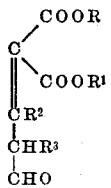

in which R and R[1] are lower alkyl groups containing one to four carbon atoms, R[2] and R[3] are selected from the group consisting of hydrogen and methyl and R[2] and R[3] are not both methyl, which comprises preparing a solution of a halogen substituted malonic ester in absolute ethanol, adding sodium ethoxide to said solution, gradually adding thereto an unsaturated aldehyde having the formula

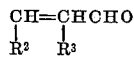

allowing the reaction to proceed for an extended period of time, thereafter adding further sodium ethoxide to the solution to effect dehydrohalogenation and to precipitate sodium halide, removing the precipitated sodium halide and recovering the unsaturated aldehyde.

OWEN A. MOE.
DONALD T. WARNER.

No references cited.